March 6, 1945. S. W. HAYES 2,371,048
TORCH CUTTING APPARATUS
Original Filed March 20, 1940
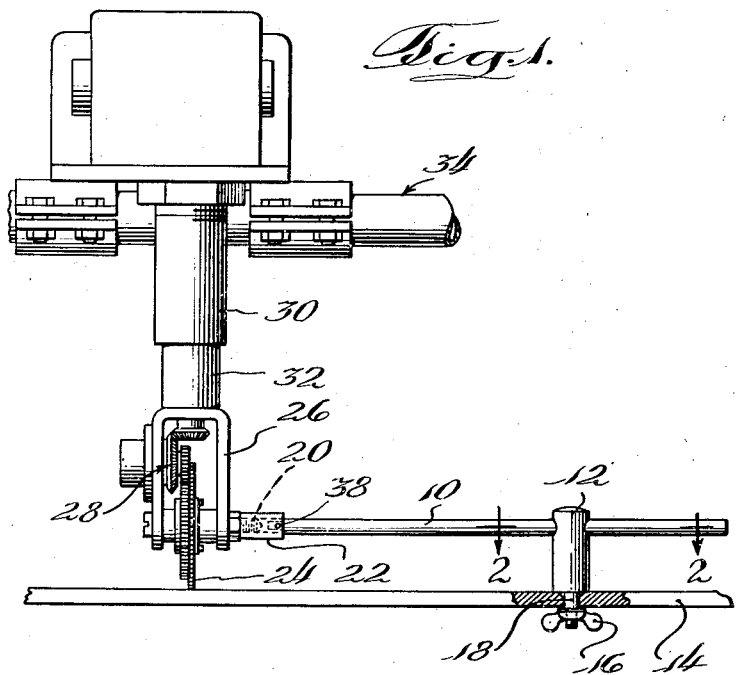
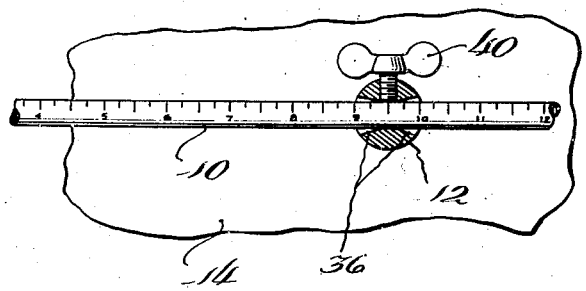
Inventor
Stanley W. Hayes
By Williams, Bradbury & Hinkle
Attorneys

Patented Mar. 6, 1945

2,371,048

UNITED STATES PATENT OFFICE 2,371,048

TORCH CUTTING APPARATUS

Stanley W. Hayes, Richmond, Ind., assignor to Hayes Track Appliance Company, Richmond, Ind., a corporation of Indiana Application August 26, 1942, Serial No. 456,144, which is a division of application Serial No. 325,084, March 20, 1940, now Patent No. 2,317,526, dated April 27, 1943. Divided and this application October 25, 1943, Serial No. 507,650

3 Claims. (Cl. 33—27)

The present invention relates to metal working apparatus and particularly to apparatus of the type in which metal cutting means is so mounted that it duplicates the movement of a combined guiding, tracing and propelling means. This application is a division of my copending application Serial No. 456,144, filed August 26, 1942, which is in turn a division of my application Serial No. 325,084, filed March 20, 1940, which matured as Patent No. 2,317,526 on April 27, 1943.

Generally speaking, metal working apparatus of the type to which this invention pertains has been known and used for a considerable period. The apparatus comprises a cutting means, generally termed a torch and employing a gaseous medium or mediums that provide an exceedingly hot flame when ignited, mounted upon a pantograph. The pantograph is a device universally movable over a plane surface, the area of which is determined by the physical dimensions of the pantograph. The pantograph is propelled through the intermediary of a tracing wheel and the torch duplicates the movement of the wheel.

The primary object of the present invention is the provision of a new and improved circle cutting attachment adapted to be used with the apparatus.

Further objects and advantages of the invention will become apparent from the ensuing description, in the course of which reference is had to the accompanying drawing, in which:

Fig. 1 is a front elevational view, partly in section, of the circle cutting attachment of the present invention, attached to the tracing wheel of a torch cutting apparatus, of which only a part of the pantograph has been shown; and Fig. 2 is a fragmentary horizontal section taken along the line 2—2 of Fig. 1.

The circle cutting attachment comprises a suitably indexed rod 10 mounted upon a support 12 secured for rotation on a tracing wheel table 14 by a wing nut 16 threaded onto a reduced portion 18 of the support extending through the table. One extremity of the rod is secured to the threaded projecting end of a tracing wheel shaft 20 by an internally threaded sleeve 22.

A tracing wheel 24 is journaled for rotation on the shaft 20. The shaft is mounted at the lower end of a fork 26 formed by bending a single piece of metal into a substantially U shape. The tracing wheel may be driven by a motor (not shown) operatively connected to the wheel through gearing indicated generally by reference character 28. The fork 26 is secured to a hollow tubular supporting member 30 by a tubular supporting member 32 rotatable relative to the support 30. If desired, the tracing wheel assembly may be propelled manually upon deenergization of the motor and by grasping the pantograph structure, only part of which is illustrated and which is indicated by reference character 34. It is preferred that in manual propelling either support 30 or support 32 be grasped, dependent on whether the wheel is to be guided definitely by the operator or by a suitable templet.

The connection of the tracing wheel to the radius rod 10 is such that the tracing wheel can move some slight distance up or down without cramping the rod, yet it cannot swing sideways. These results are obtained by taper reaming the hole in post 12 through which the rod passes, as indicated by reference character 36, and threading sleeve 22 so that the inner end of rod 10 fits into it loosely, but preventing sidewise motion of the rod by a pin 38 passing horizontally through the sleeve and the reduced end of the rod.

From the foregoing description, it may be noted that when the tracing wheel is propelled on the surface of the tracing wheel table, it will describe an arc, as it can move only about a center determined by the rod support 12. The radius of the circle described by the tracing wheel, and likewise by the torch is adjustable by varying the length of the rod 10 included between the tracing wheel and support 12. Adjustment of the rod may be effected by loosening a wing nut 40 utilized to secure the rod in its various positions of adjustment.

The circle cutting attachment of the present invention may be constructed readily and economically. Furthermore, it may be easily adjusted to cut circles with different radii, and it may be easily secured to the tracing wheel assembly.

Having thus described my invention, what I claim as new and desire to secure by Letters Patent of the United States is:

1. In apparatus of the type comprising a tracing wheel and a support therefor including a threaded shaft extending outwardly therefrom, mechanism for constraining movement of the wheel to a circular path, said means comprising a radius rod connected at one end to said threaded shaft and a rotatable mounting post adapted adjustably to receive the other end of the rod, the connection of the rod to the threaded shaft comprising a coupling sleeve receiving the rod relatively loosely and a relatively tight, horizontally disposed pin extending through the rod and sleeve, whereby the rod and tracing wheel may move vertically but not sidewise relative to each other, and the aperture in said post being tapered in opposite directions to permit relative movement between the rod and post.

2. In apparatus of the type comprising a tracing wheel and a support therefor, mechanism for constraining movement of the wheel to a circular path, said means comprising a radius rod connected at one end to said support and a rotatable mounting member adapted to receive the other end of the rod, the connection of the rod to the support comprising a coupling member receiving the rod relatively loosely and a relatively tight, horizontally disposed pin extending through the rod and coupling member, whereby the rod and tracing wheel may move vertically but not sidewise relative to each other.

3. In apparatus of the type comprising a tracing wheel and a support therefor, mechanism for constraining movement of the wheel to a circular path, said means comprising a radius rod connected at one end to said support and a rotatable mounting member adapted adjustably to receive the other end of the rod, the connection of the rod to the support including structure constraining sidewise movement of the rod relative to the tracing wheel and enabling the two to move vertically relative to each other, whereby the rod and tracing wheel may move vertically but not sidewise relative to each other, and said rotatable mounting member having an aperture therein enabling the rod to move vertically with respect to said mounting member.

STANLEY W. HAYES.